(12) United States Patent
Iasso et al.

(10) Patent No.: US 11,557,198 B2
(45) Date of Patent: Jan. 17, 2023

(54) NETWORK DISTRIBUTION USING COMMON COMMUNICATION AND POWER

(71) Applicant: Siemens Industry, Inc., Alpharetta, GA (US)

(72) Inventors: Daniel S. Iasso, Towaco, NJ (US); Johnar Maneja, Jersey City, NJ (US)

(73) Assignee: Siemens Industry, Inc., Alpharetta, GA (US)

(*) Notice: Subject to any disclaimer, the term of this patent is extended or adjusted under 35 U.S.C. 154(b) by 136 days.

(21) Appl. No.: 17/007,065

(22) Filed: Aug. 31, 2020

(65) Prior Publication Data

US 2022/0068115 A1 Mar. 3, 2022

(51) Int. Cl.
| G08B 25/06 | (2006.01) |
| G08B 25/00 | (2006.01) |
| G08B 25/08 | (2006.01) |
| H04B 3/54  | (2006.01) |

(52) U.S. Cl.
CPC .......... *G08B 25/06* (2013.01); *G08B 25/009* (2013.01); *G08B 25/08* (2013.01); *H04B 3/54* (2013.01)

(58) Field of Classification Search
CPC ...... G08B 25/06; G08B 25/009; G08B 25/08; H04B 3/54
See application file for complete search history.

(56) References Cited

U.S. PATENT DOCUMENTS

| 6,441,723 | B1 | 8/2002 | Mansfield, Jr. et al. |
| 6,822,555 | B2 | 11/2004 | Mansfield, Jr. et al. |
| 8,013,755 | B2 | 9/2011 | Rock et al. |
| 10,249,174 | B2 | 4/2019 | El-Mankabady et al. |
| 2007/0146128 | A1* | 6/2007 | Pumpelly ............. G08B 25/009 340/521 |
| 2008/0258903 | A1* | 10/2008 | Le .......................... G08B 25/06 340/506 |
| 2008/0310850 | A1* | 12/2008 | Pederson .......... G08B 13/19645 398/135 |
| 2009/0184835 | A1* | 7/2009 | Deaver, Sr. ........ H02J 13/00024 340/660 |
| 2011/0018704 | A1* | 1/2011 | Burrows .................. H04B 3/54 340/538 |
| 2015/0130610 | A1 | 5/2015 | Kalivas et al. |
| 2018/0061212 | A1* | 3/2018 | Dayalan .................. H04W 4/38 |
| 2018/0276980 | A1* | 9/2018 | Yukizane ............... G08B 17/10 |

(Continued)

FOREIGN PATENT DOCUMENTS

CN 108898783 11/2018

OTHER PUBLICATIONS

PCT Search Report dated Oct. 15, 2021, for PCT Application No. PCT/US2021/039171, 15 pages.

*Primary Examiner* — Omeed Alizada

(57) ABSTRACT

There is described a network distribution system using common communication and power comprising a power line, multiple fire alarm units, and a power line control device. The power line provides alternating current, and the fire alarm units are coupled to the power line. The power line control device is coupled to the power line and a particular fire alarm unit of the plurality of fire alarm units. The power line control device comprises a communication translator to convert between power line and non-power line protocols and a power line core to modulate signals to, and demodulate signals from, the power line.

15 Claims, 4 Drawing Sheets

(56) References Cited

U.S. PATENT DOCUMENTS

2021/0080514 A1\* 3/2021 Beaudet .................. H04Q 9/02
2021/0116517 A1\* 4/2021 Snook, II ............. G01R 31/002
2021/0212606 A1\* 7/2021 Tran ..................... A61B 5/0255

\* cited by examiner

NETWORK DISTRIBUTION USING COMMON COMMUNICATION AND POWER

FIELD OF THE INVENTION

This application relates to the field of building management systems and, more particularly, to a network distribution for a fire alarm system.

BACKGROUND

Conventional fire alarm systems require communication and power circuits dedicated to fire alarm control for proper operation. Independent physical connections for communications and power lines are typically needed for paths between panels and between panels and devices. Communication lines include a dedicated communication network using different communication channels for various protocols and typically has been a serial communication (such as RS485 or RS232) through twisted pair copper wires, ethernet, fiber or wireless. Current single pair of copper wire solutions still require AC power.

National and local municipalities have adopted the he National Fire Alarm and Signaling Code (NFPA 72) as their standard for implementing and managing fire detection, signaling, and emergency communications for fire alarm system. NFPA 72 specifies classifications for signal paths of fire alarm systems to ensure reliable operation, reparability, and sustainability. Particularly notable are classes A and X of NFPA 72 which specify redundant signal paths to reduce operational disruption in case of interruption and continual communications including indications of any problems. Also, similar to other classes, class B of the NFPA 72 which requires detection of an error condition in the case of a wire fault.

Wireless technologies may be used to reduce the amount of physical wiring for a fire alarm system. However, wireless communication is considered to be a class N solution only so it cannot be offered as a solution in compliance with NFPA 72, including classes A and X. For this reason, some fire jurisdictions will not allow wireless. Even if a wireless solution is implements, some jurisdictions requires a dedicated AC trunk line for the fire alarm system.

SUMMARY

In accordance with one embodiment of the disclosure, there is provided a common line power and communication approach for fire alarm systems. The approach allows users to establish multiple node and/or multiple transponder fire control systems without the need for a wire connection other than power lines nor any form of wireless communication. Fire panel equipment may be connected together by a dedicated power trunk without the need for any additional wires for fire and fire-voice communication. In a sense, the approach is a simplification of conventional systems that provide cost savings, for example, at the time of installation.

One aspect is a network distribution system using common communication and power comprising a power line, multiple fire alarm units, and a power line control device. The power line provides alternating current. The fire alarm units are coupled to the power line. The power line control device is coupled to the power line and a particular fire alarm unit of the plurality of fire alarm units. The power line control device comprises a communication translator and a power line core. The communication translator converts a fire alarm communication between a power line protocol and one or more non-power line protocol. The communication translator also provides the fire alarm communication in the non-power line protocol to the particular fire alarm unit. The power line core provides outgoing power line signal to the power line by modulating the fire alarm communication in the power line protocol from the communication translator. The power line core also provides the fire alarm communication in the power line protocol to the communication translator by demodulating the incoming power line signal from the power line.

Another aspect is a power line control device of a network distribution system using common communication and power comprising an I/O component, a communication translator, and a power line core. The I/O component is coupled to a non-power communication line and a power line. The non-power communication line conveys a fire alarm communication, and the power line conveys alternating current and the fire alarm communication. The communication translator converts the fire alarm communication between a power line protocol and one or more non-power line protocol. The communication translator also provides the fire alarm communication in the non-power line protocol with the communication line. The power line core provides an outgoing power line signal to the power line by modulating the fire alarm communication in the power line protocol from the communication translator. The power line core also provides the fire alarm communication in the power line protocol to the communication translator by demodulating the incoming power line signal from the power line.

Yet another aspect is a method for a power line control device of a network distribution system using common communication and power. Alternating current is received from a power line. A fire alarm communication is generated in a power line protocol based on an incoming power line signal of the power line. The fire alarm communication is converted from the power line protocol to one or more non-power line protocol in response to generating the fire alarm communication. The fire alarm communication provides in the one or more non-power line protocol to a non-power communication line.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, where like numbers designate like objects.

DETAILED DESCRIPTION

Figure 1:
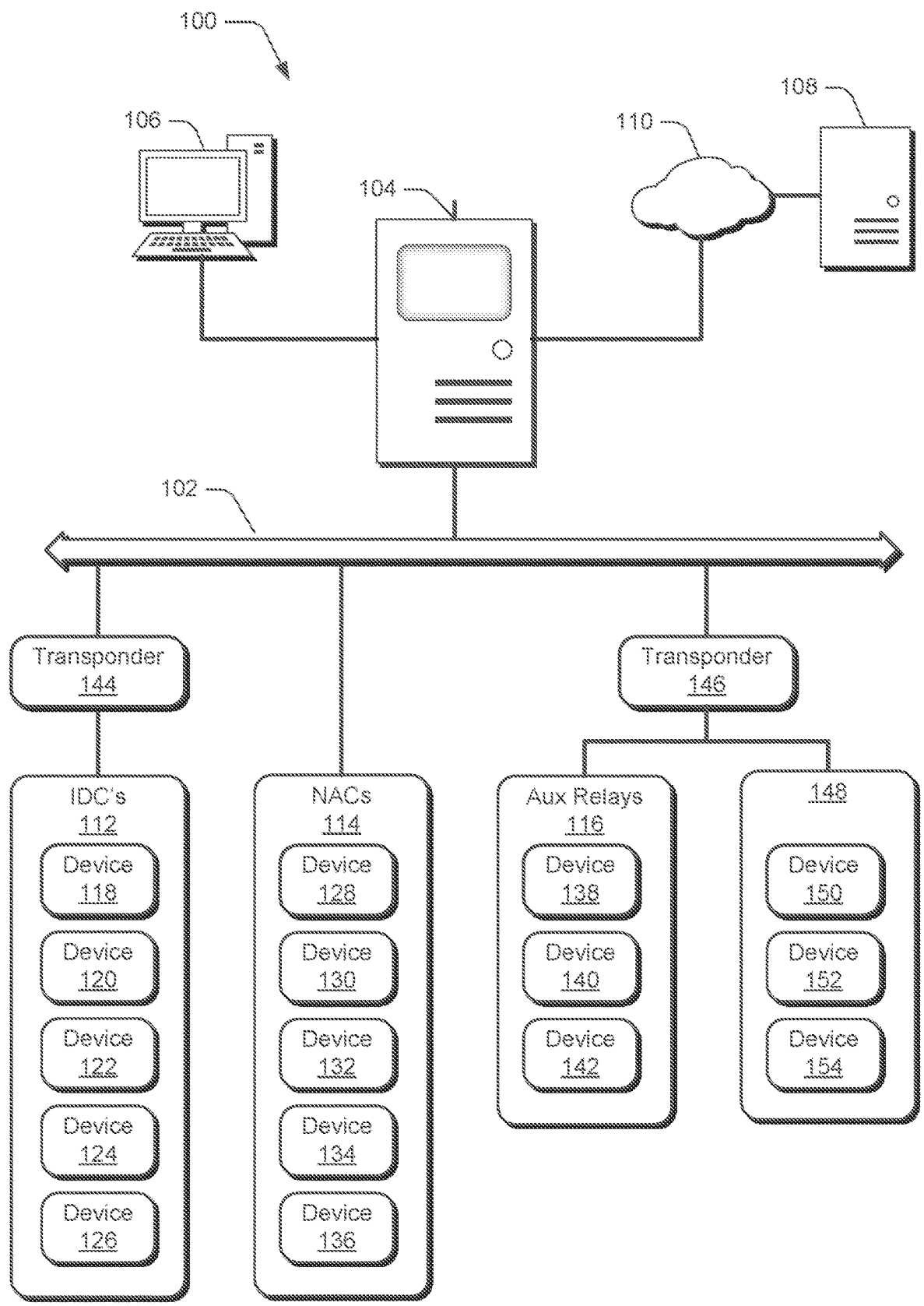
FIG. 1 is a schematic view depicting a building management system in an example implementation that is operable to employ techniques described herein.

Various technologies that pertain to systems and methods that facilitate common line power and communication will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The common line power and communication approach leverages existing power lines to convey information to panels and devices of fire alarm systems. Power line communication (PLC) technology exists for conventional applications. For example, HomePlug AV2 is a standard PLC specification that is IEEE 1901 standard compliant and used in household markets. PLC may be used as a substitute for different application protocols in fire alarm systems but must be adapted for compliance with fire safety standards, such as NFPA 72.

The common line power and communication approach addresses the problems with adapting PLC technology to a fire alarm system. The fire alarm system communicates over a power line used to connect the power of one fire alarm unit, such as a fire alarm control panel, to the next over dedicated power lines. The common line power and communication approach includes NFPA 72 compliant power topology, ground fault detection, and other supervision and survivability features that are not addressed by conventional PLC technology-based communications.

Referring to FIG. 1, there is shown a fire alarm system 100 having a network distribution system. The fire alarm system 100 includes a communication bus 102 to facilitate communications among various components, such as one or more fire alarm control panels 104 and associated devices. A fire alarm control panel 104 is a device that identifies fire-related hazards based on data received from fire-related input devices and manages fire-related output devices based on the identified fire-related hazards.

The fire alarm system 100 may also include other components, such as one or more management devices 106 of the system or outside devices 108 that may communicate indirectly with system components via a communication network 110. A management device 106, such as a workstation and/or server, sets and/or changes functions of the various components communicating other system devices, such as the fire alarm control panel 104. Examples of the outside devices include, but are not limited to, remote terminals for receiving, providing, exchanging, or analyzing data associated with fire-related hazards. While a brief description of the fire alarm system 100 is provided below, it is to be understood that the fire alarm system described herein is only one example of a particular form or configuration for the fire alarm system and the system may be implemented in any other suitable manner without departing from the scope of this disclosure.

For the embodiment represented by FIG. 1, the communication bus 102 provides connectivity to subsystems for various fire safety parameters. For example, each fire alarm control panel 104 of the fire alarm system 100 may communicate via the communication bus 102 with various fire-related devices, such as initiating device circuit (IDC) devices 112, notification appliance circuit ("NAC") devices 114, and fire alarm relay devices 116, for monitoring and controlling fire alarm environments within a commercial or residential facility. Examples of IDC devices 112 include, but are not limited to, smoke detectors 118, temperature detectors 120, air duct devices 122, input/output modules 124, and pull stations 126. The NAC devices 114 notify occupants of a facility about a fire or other life-threatening emergency. The NAC is a physical wire loop that provides power to NAC devices 114, so the NAC supervises the wires that make up the circuit as opposed to the devices themselves. The circuit extends from the fire alarm control panel 104 to the NAC devices 114 located within the facility as connected by the physical wire loop. Examples of the NAC devices includes, but are not limited to, strobes 128, horns 130, chimes, bells 132, klaxons 134, and speakers 136. The fire alarm relay devices 116 are similar to the NAC devices 114 but require more management than mere power control, such as speakers that require audio signals for providing dynamic sounds and announcements. It is to be understood that the fire alarm system 100 may comprise any suitable number of any of components 112-142 based on particular configurations for each facility or group of facilities.

For some embodiments, the fire alarm system 100 may include one or more transponders 144, 146 for connecting fire-related devices 118-126, 138-142, 150-154 to a particular fire-alarm control panel 104. Each transponder 144, 146 may communicate with the fire alarm control panel 104 and multiple wired or wireless devices. For example, the fire alarm system 100 may include an addressable transponder 146 that communicates with the fire alarm control panel 104 and multiple devices 138-142, 150-154 via a particular communication protocol for the fire alarm control panel.

Figure 2:
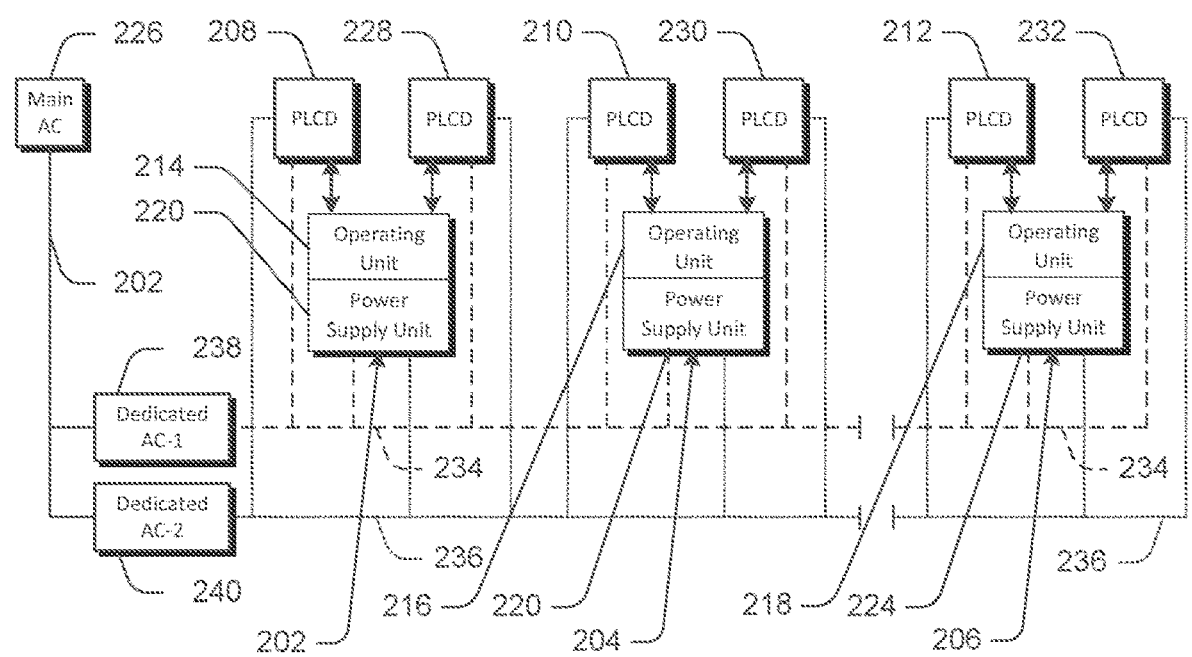
FIG. 2 is a schematic view depicting a fire alarm system in an example implementation that is operable to employ techniques described herein.

Referring to FIG. 2, there is shown a network distribution system of a fire alarm system 200 with multiple fire alarm units 202-206 as well as a power line control device (PLCD) 208-212 corresponding to each fire alarm unit. Each power line control device 208-212 may be included internal, or accompany external, to a housing of the corresponding fire alarm unit 202-206. Each fire alarm unit 202-206 includes an operating unit 214-218 configured to control operations of the fire alarm unit and a power supply unit 220-224 configured to receive power. Examples of fire alarm units includes, but are not limited to, a fire alarm control panel, a fire alarm transponder, a fire alarm detection device, and a fire alarm notification appliance. For some embodiments, each fire alarm unit 202-206 may be associated with multiple power line control devices 208-212, 228-232 for redundancy for the purpose of reliability. For some embodiments each fire alarm unit 202-206 may be associated with multiple power line control devices 208-212, 228-232 to provide communications to devices associated with a particular fire alarm unit, such as a transponder associated with a particular fire alarm control panel.

Power may be provided to the fire alarm units 202-206 in more than one way. For some embodiments, each power supply unit 220-224 may receive power from a power source, such as a main alternating current source 226, and provide power to the corresponding operating units 214-218. For some embodiments, the power line control devices 208-212, 228-232 may manage power for the fire alarm units 202-206 by receiving power from a power source, such as a main alternating current source 226, and providing the power to the corresponding operating units 214-218. Thus, each power supply unit 220-224 may receive power from one or more corresponding power line control devices 208-212, 228-232 and provide power to the corresponding operating units 214-218, thus omitting the need from a direct connection between the power supply units and the power source.

The network distribution system of the fire alarm system 100 provides a common line power and communication to each fire alarm unit 202-206 via the corresponding power line control device 208-212. As such, a common line 234 is coupled between the main alternating current source 226 and each power line control device 208-212 as well as between the various power line control devices. In turn, each power line control device 208-212 provides communications, and power for some embodiments, to its corresponding fire alarm unit 202-206. In comparison, conventional systems utilize separate lines for power and control to each fire alarm unit as well as multiple wires to each unit for communication. In accordance with the above, each fire alarm unit 202, 206 receives alternating current to power its operating unit 214-218, and each fire alarm unit transmits and receives communication signals encoded or encrypted in the alternating current via a corresponding power line control device 208-212 to communicate with its operating unit.

For some embodiments, the network distribution system of the fire alarm system 100 includes multiple common lines 234, 236 for redundancy to increase reliability of the system and comply with applicable legal regulations. For example, in order to comply with Class A and/or Class X of NFPA 72, the outgoing and return paths for both Class A and Class X must be separate and distinct. Thus, a first power line 234 provides alternating current to each fire alarm unit 202-206 and its corresponding power line control device 208-212, and a second power line 236 redundantly provides the alternating current to each fire alarm unit and its corresponding power line control device. The separate and distinct power lines 234, 236 may be provided by separate and distinct secondary alternating current sources 238, 240 coupled to the main alternating current source 226.

The network distribution system also applies to fire alarm systems that include a single common line as well as multiple common lines. Multiple nodes or transponders may be installed without the need for other wire connections other than power between endpoints. For example, an AC trunk may be used to connect fire panel equipment together for fire and fire-voice communication without any additional wires. The network distribution system would comply with Class B and other classes of NFPA 72, which require detection of error conditions in the case of a wire fault, such as a single open wire or a shorted wire.

Figure 3:
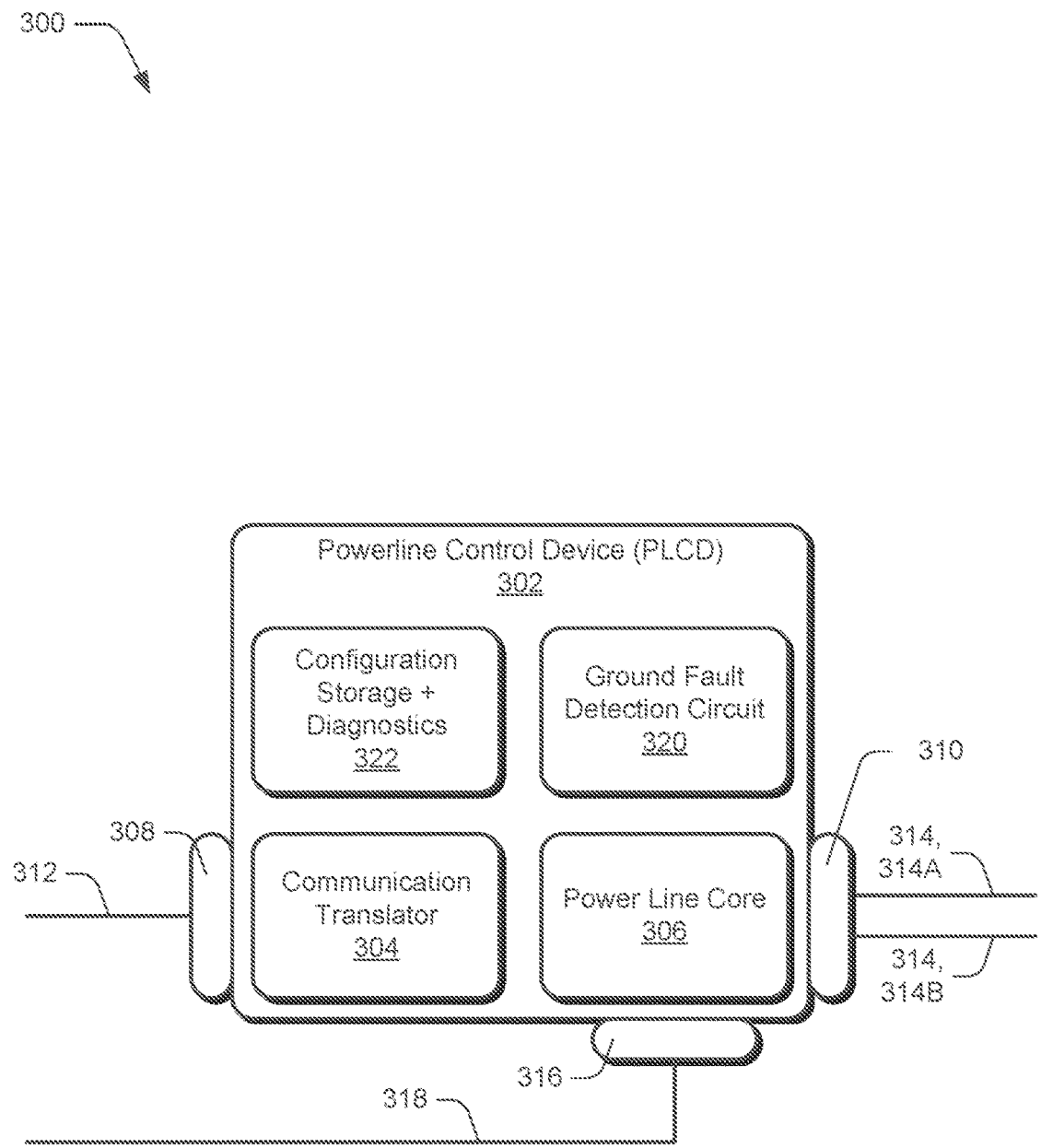
FIG. 3 is a schematic view depicting a power line control device in an example implementation that is operable to employ techniques described herein.

Referring to FIG. 3, there is shown a power line control device (PLCD) 302 of the fire alarm system. In particular, FIG. 3 represents a power line control device 302 of a network distribution system 300 that uses common communication and power. The power line control device 302 includes a communication translator 304, a power line core 306, and an input/output component (I/O component) 308, 310 coupled to a non-power communication line 312 and at least one power line 314. The I/O component 308, 310 includes a first I/O component 308 that is coupled to the non-power communication line 312, which provides a network communication connection. The I/O component 308, 310 includes a second I/O component 310 that is coupled to the power line 314, which provides an alternating current connection. As described above in reference to FIG. 2, for some embodiments, the power line 314 coupled to the second I/O component 310 may include a first power line 314A and a second power line 314B, in which each of the first and second power lines provides an alternating current connection.

The non-power communication line 312 conveys a fire alarm communication and the power line 314 conveys alternating current and the fire alarm communication. For some embodiments, the power line 314 may include an alternating current (AC) that provides power to the power line control device 302 and act as a carrier signal to convey the fire alarm communication. Accordingly, the carrier signal may be modulated with a communication signal bearing the fire alarm communication and, likewise, the communication signal may be demodulated from the carrier signal. In comparison, the non-power communication line 312 is a network communication line that is used to convey the fire alarm communication (in a format different from the power line 314) within regard to its usefulness in providing power to any particular device. For some embodiments, the communication signal carried by the non-power communication line 312 may include one or more signals based on an Arcnet, BACnet, Controller Area Network, Ethernet, or a proprietary fire alarm protocol. Thus, one or more non-power line protocols may provide communication to at least one of a fire alarm control panel, a fire alarm transponder, an initiating device circuit, a notification appliance circuit, or a relay circuit.

The communication translator 304 includes physical media adapters to translate information back-and-forth between the associated operational unit and the power line core 306 by converting media and protocol formats between them. The communication translator 304 converts the fire alarm communication between a power line protocol and one or more non-power line protocol. For fire alarm communications incoming to the first I/O component 308 from the non-power communication line 312, the communication translator 304 converts the communication from the non-power line protocol to the power line protocol and provides the converted communication to the power line core 306. For fire alarm communications incoming from the power line core 306, the communication translator 304 converts the processed communication from the power line protocol to the non-power line protocol and provides the converted communication to the non-power communication line 312 via the second I/O component 310. For some embodiments, the communication translator converts the fire alarm communication at least one of Arcnet, BACnet, Controller Area Network, Ethernet, or a proprietary fire alarm protocol. For some embodiments, the fire alarm communications are packets of data, in which each packet includes a header to indicate one or more of the following: source address, destination address, and message type. For example, the message type may be a global message in which the receiver is not required to respond or a specific message in which the device addressed by the message is required to respond. For some embodiments, each packet may be addressed to one or more specific devices but received by non-addressed devices such that the non-addressed devices ignore the particular packet received.

The power line core 306 utilizes PLC technology to transmit and/or receive data over power lines, particularly alternating current power lines. The power line core 306 provides an outgoing power line signal to the power line 314 via the second I/O component 314. In particular, the power line core 306 may modulate the fire alarm communication in the power line protocol received from the communication translator 304. The power line core 306 may also provide the fire alarm communication in the power line protocol to the communication translator 304. In particular, the power line core 306 demodulates the incoming power line signal from the alternating current of the power line 314. For some embodiments, the power line core 306 may packetize data, directed to a variety of devices, together for communication with other power line control devices 302, using difference frequencies on a superimposed carrier signal.

As stated above in reference to FIG. 2, for some embodiments, the power line control devices 302 may manage power for the fire alarm units by receiving power from a power source at the second I/O component 310 and providing the power to the corresponding operating units of the fire alarm units. Separate from the first I/O component 308 and the non-power communication line 312, these embodiments of the power line control devices 302 may include a third I/O component 316 to provide power to the fire alarm units via PLCD power line 318. By providing power to the fire alarm units through the power line control devices 302, each power line control device manages the power and functions of the corresponding fire alarm unit. It is to be noted that the non-power communication line 312 and the PLCD power line 318 may be physically separate from each other or physically combined while operating separately.

In addition to the communication translator 304 and the power line core 306, the power line control device 302 may include a ground fault detection circuit. The ground fault detection circuit detects, manages, and reports a ground fault to the fire alarm unit coupled to the power line control device 302. The ground fault detection circuit 320 monitors for a first ground fault because a second ground fault, subsequent to the first ground fault, will cause an alarm condition. The ground fault detection circuit 320 distinguishes between the ground fault and the alarm by measuring the current of the communication line.

For some embodiments, the power line control device 302 may further include circuits for configuration, storage, and/or diagnostics 322. A configuration storage and diagnostics circuit 322 may perform various operations to setup and maintain proper operation of the device.

Figure 4:
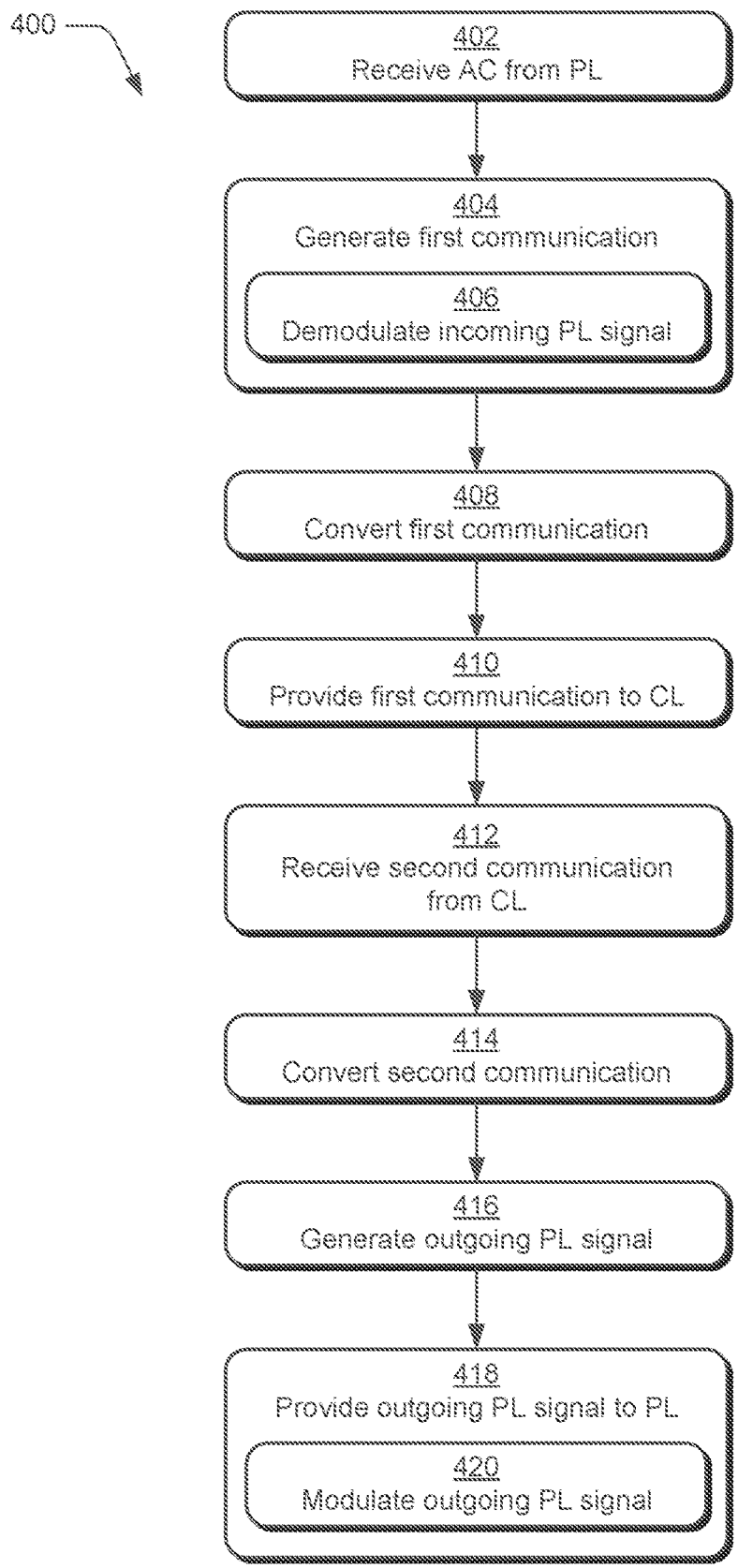
FIG. 4 is a flow diagram depicting power line control operation in an example implementation that is operable to employ techniques described herein.

Referring to FIG. 4, there is shown a flow diagram depicting a method 400 for a power line control device 302 of a network distribution system using common communication and power. The power line control device 302 receive an alternating current from a power line (PL) from a power line 314 connected to the second I/O component 310 (402). The power line control device 302 then generates a first alarm communication in a power line protocol based on an incoming power line signal of the power line (404). For example, the power line control device 302 may generate the fire alarm communication in the power line protocol by demodulating the incoming power line signal from the alternating current of the power line (406).

In response to generating the fire alarm communication (404), the power line control device 302 converts the fire alarm communication from the power line protocol to one or more non-power line protocols (408). For some embodiments, the power line control device 302 may convert the fire alarm communication to one or more of an Arcnet, BACnet, Controller Area Network, Ethernet, or a proprietary fire alarm protocol. For some embodiments, the at least one non-power line protocol may provide communications to one or more of a fire alarm control panel, a fire alarm transponder, an initiating device circuit, a notification appliance circuit, or a relay circuit. The power line control device 302 provides the fire alarm communication in the non-power line protocol(s) to a non-power communication line (CL) (410). For some embodiments, the power line control device (410) may provide the outgoing power line signal to the power line by modulating the outgoing power line signal to the alternating current of the power line 314.

Still referring to FIG. 4, the method 400 for a power line control device 302 of a network distribution system may also, or in the alternative, process communications incoming from the fire alarm unit to the power line 314. In particular, the power line control device 302 receives a second fire alarm communication in the non-power line protocol(s) from the non-power communication line (412). The power line control device 302 then converts the second fire alarm communication from the non-power line protocol(s) to the power line protocol (414) in response to receiving the second fire alarm communication (412). Next, the power line control device 302 generates an outgoing power line signal based on the second fire alarm communication in the power line protocol (416). The power line control device 302 provides the outgoing power line signal to the power line (418). For example, the power line core 306 of the power line control device 302 may modulate the outgoing power line signal to the alternating current of the power line 314 (420).

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A network distribution system using common communication and power comprising:

a power line providing alternating current, the power line including a first power line and a second power line;

a plurality of fire alarm units coupled to the power line;

a first power line control device coupled to the first power line and a particular fire alarm unit of the plurality of fire alarm units; and a second power line control device coupled to the second power line and the particular fire alarm unit of the plurality of fire alarm units, each of the first and second power line control devices including:

a communication translator to convert a fire alarm communication between a power line protocol and at least one non-power line protocol and to provide the fire alarm communication in the non-power line protocol to the particular fire alarm unit, wherein the at least one non-power line protocol includes at least one of Arcnet, BACnet, or Controller Area Network; and a power line core to provide outgoing power line signal to the corresponding power line by modulating the fire alarm communication in the power line protocol from the communication translator and provide the fire alarm communication in the power line protocol to the communication translator by demodulating the incoming power line signal from the corresponding power line.

2. The network distribution system as described in claim 1, wherein each power line control device extracts the fire alarm communication from the alternating current of the power line and provides the fire alarm communication to a network communication connection to the particular fire alarm unit.

3. The network distribution system as described in claim 1, wherein the fire alarm unit is at least one of a fire alarm control panel, a fire alarm transponder, an initiating device circuit, a notification appliance circuit, or a relay circuit.

4. The network distribution system as described in claim 1, wherein the power line core demodulates the incoming power line signal from the alternating current of the power line.

5. The network distribution system as described in claim 1, wherein the power line core modulates the outgoing power line signal to the alternating current of the power line.

6. A power line control device of a network distribution system using common communication and power comprising:

an I/O component coupled to a non-power communication line and a power line, the non-power communication line conveying a fire alarm communication and the power line conveying alternating current and the fire alarm communication;

a communication translator to convert the fire alarm communication between a power line protocol and at least one non-power line protocol and to provide the fire alarm communication in the non-power line protocol with the communication line, wherein the at least one non-power line protocol includes at least one of Arcnet, BACnet, or Controller Area Network; and a power line core to provide an outgoing power line signal to the power line by modulating the fire alarm communication in the power line protocol from the communication translator and provide the fire alarm communication in the power line protocol to the communication translator by demodulating the incoming power line signal from the power line, wherein the power line coupled to the I/O component includes a first power line and a second power line, and wherein the power line control device is a first power line control device of a fire alarm unit coupled to the first power line, the first power line control device operating in conjunction with a second power line control device of the fire alarm unit coupled to the second power line.

7. A power line control device as described in claim 6, wherein the I/O component is coupled to the non-power communication line providing a network communication connection.

8. A power line control device as described in claim 6, wherein the at least one non-power line protocol provides communication to at least one of a fire alarm control panel, a fire alarm transponder, an initiating device circuit, a notification appliance circuit, or a relay circuit.

9. A power line control device as described in claim 6, wherein the power line core demodulates the incoming power line signal from the alternating current of the power line.

10. A power line control device as described in claim 6, wherein the power line core modulates the outgoing power line signal to the alternating current of the power line.

11. A method for a power line control device of a network distribution system using common communication and power, the method comprising:

receiving alternating current from a power line, the power line including a first power line and a second power line;

operating a first power line control device of a fire alarm unit in conjunction with a second power line control device of the fire alarm unit, the first power line control device being coupled to the first power line and the second power line control device being coupled to the second power line;

generating a fire alarm communication in a power line protocol based on an incoming power line signal of the power line;

converting the fire alarm communication from the power line protocol to at least one non-power line protocol in response to generating the fire alarm communication, wherein the at least one non-power line protocol includes at least one of Arcnet, BACnet, or Controller Area Network; and providing the fire alarm communication in the at least one non-power line protocol to a non-power communication line.

12. The method as described in claim 11, wherein generating the fire alarm communication in the power line protocol includes demodulating the incoming power line signal from the alternating current of the power line.

13. The method as described in claim 11, wherein the at least one non-power line protocol provides communications to at least one of a fire alarm control panel, a fire alarm transponder, an initiating device circuit, a notification appliance circuit, or a relay circuit.

14. The method as described in claim 11, further comprising receiving a second fire alarm communication in the at least one non-power line protocol from the non-power communication line;

converting the second fire alarm communication from the at least one non-power line protocol to the power line protocol in response to receiving the second fire alarm communication;

generating an outgoing power line signal based on the second fire alarm communication in the power line protocol; and providing the outgoing power line signal to the power line.

15. The method as described in claim 11, wherein providing the outgoing power line signal to the power line includes modulating the outgoing power line signal to the alternating current of the power line.

* * * * *